United States Patent
Lindoff

(10) Patent No.: US 6,628,706 B1
(45) Date of Patent: Sep. 30, 2003

(54) METHOD AND APPARATUS FOR TRANSFORMING A CHANNEL ESTIMATE

(75) Inventor: Bengt Lindoff, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/455,087

(22) Filed: Dec. 6, 1999

(51) Int. Cl.[7] .................................................. H04H 7/40
(52) U.S. Cl. .................... 375/231; 375/324; 375/342; 329/316; 332/108; 332/119; 332/151; 455/102
(58) Field of Search ........................ 375/229, 231, 375/259, 316, 324, 325, 340, 342, 354, 364, 285, 346, 284; 370/503, 509, 514, 321, 337, 347, 342; 329/316, 317, 327, 348; 332/108, 119, 120, 151; 455/52.1, 52.2, 52.3, 102, 63

(56) References Cited

U.S. PATENT DOCUMENTS

| | | | |
|---|---|---|---|
| 5,239,306 A | * 8/1993 | Siwiak et al. | 340/7.35 |
| 5,673,288 A | * 9/1997 | Okanoue | 375/231 |
| 5,937,014 A | 8/1999 | Pelin et al. | |
| 6,130,894 A | * 10/2000 | Ojard et al. | 370/421 |
| 6,327,315 B1 | * 12/2001 | Piirainen | 375/340 |
| 6,337,855 B1 | * 1/2002 | Malkamaki | 370/347 |
| 6,370,205 B1 | * 4/2002 | Lindoff et al. | 375/319 |
| 6,373,888 B1 | * 4/2002 | Lindoff | 375/231 |
| 6,400,928 B1 | * 6/2002 | Khullar et al. | 455/67.1 |
| 6,449,320 B1 | * 9/2002 | Lindoff | 375/319 |
| 6,463,107 B1 | * 10/2002 | Lindoff et al. | 375/343 |
| 6,473,506 B1 | * 10/2002 | Hook et al. | 379/279 |

FOREIGN PATENT DOCUMENTS

| | | |
|---|---|---|
| GB | 2335123 | 9/1999 |
| JP | 06268540 | 9/1994 |
| JP | 10126321 | 2/1998 |
| WO | 96/13910 | 5/1996 |

OTHER PUBLICATIONS

Proakis, J., Digital Communications, Chapters 5 and 5.2, McGraw–Hill Inc., New York, 1995.

Perry et al, "Design of Synchronization Sequences for Mobile Radio Channel Impulse Response estimation", Proceedings 2nd International Workshop on Mobile Multimedia Communications, 11–3 Apr. 1995, Bristol UK.

* cited by examiner

*Primary Examiner*—Stephen Chin
*Assistant Examiner*—Dac V. Ha
(74) *Attorney, Agent, or Firm*—Burns, Doane, Swecker & Mathis, L.L.P.

(57) ABSTRACT

Channel estimation is performed for a received signal, wherein different parts of the received signals are modulated using different modulation types. The channel is first estimated based on part of a received signal modulated with a first modulation type. This channel estimate is then transformed into a channel estimate corresponding to at least a second modulation type.

20 Claims, 2 Drawing Sheets

METHOD AND APPARATUS FOR TRANSFORMING A CHANNEL ESTIMATE

BACKGROUND

This invention relates generally to a method and apparatus for channel estimation. More particularly, this invention relates to a method and apparatus for transforming a channel estimate obtained for one modulation type to the corresponding channel estimate for another modulation type.

In a communication system such as a cellular communication system including a transmitter, e.g., a base station, and a receiver, e.g., a mobile station or a fixed cellular terminal, information exchanged between the transmitter and receiver contains data bits and synchronization bits. The information is modulated for transmission.

In some cellular communication systems it can be an advantage to use one modulation type during a first portion of the transmitted signal, e.g., the portion used for synchronization and channel estimation, and another modulation type for a second portion of the transmitted signal, e.g., the portion containing the data to be transmitted. This allows the modulation types to be chosen for efficient transmitter implementation. For an efficient transmitter architecture, an offset is typically introduced in the modulation format. For instance for an 8-PSK signal, the transmitted signal can be given by:

$$u_t = e^{j\pi \frac{t}{8}} v_t \quad (1)$$

where $$v_t = e^{j\frac{\pi}{4}k}, k \in (0, 1, \ldots, 7) \quad (2)$$

The offset here means that the symbol constellation rotates $\pi/8$ radian between adjacent symbols. This rotation produces a transmitted signal with low peak-to-average ratio and no zero-crossing, which allows for an efficient transmitter architecture.

On the receiver side, the received signal has to be de-rotated in order to correctly detect the received symbols. However, due to multi-path propagation of the radio waves, the rotation of the received signals results in a radio channel estimate that is a function of the offset rotation.

Information in cellular radio systems is typically transmitted in bursts containing a synchronization signal, such as a training sequence, and an information sequence. If the whole burst is transmitted with the same modulation format, there are no negative effects caused by the channel estimate being a function of the offset rotation. However, if one modulation type, with a specific offset, is used for the training sequence and another modulation type, with another offset, is used for the information sequence, the channel estimate obtained for the first modulation type must be transformed to a correct channel estimate for the second modulation type.

There is thus a need for an efficient technique algorithm that transforms a channel estimate obtained for one modulation type to the corresponding channel estimate for another modulation type.

SUMMARY

It is therefore an object of the present invention to provide an accurate channel estimate for a received signal when different parts of the received signal are modulated by more than one modulation type.

According to exemplary embodiments, this and other objects are met by a method and apparatus for estimating a channel in a received signal, wherein different parts of the received signal are modulated by different modulation types. The channel is estimated based on a part of the received signal modulated using a first modulation type. The estimated channel is then transformed into a channel estimate corresponding to at least a second modulation type.

BRIEF DESCRIPTION OF THE DRAWINGS

The features, objects, and advantages of this invention will become apparent by reading this description in conjunction with the accompanying drawings, in which like reference numerals refer to like elements and in which.

DETAILED DESCRIPTION

For illustrative purposes, the following description is directed to a cellular radio communication system, but it will be understood that this invention is not so limited and applies to other types of communication systems.

Figure 1:
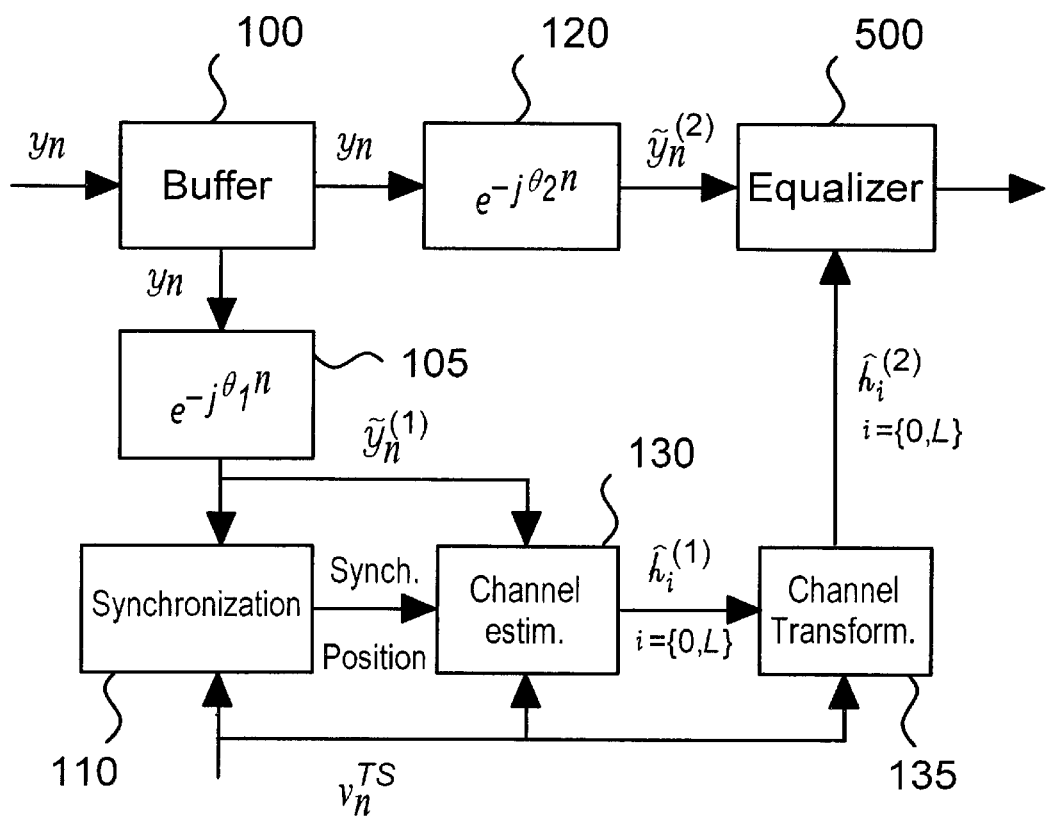
FIG. 1 illustrates an exemplary apparatus for channel estimation and transformation according to an exemplary embodiment of the present invention.

FIG. 1 illustrates an exemplary apparatus for channel estimation and transformation according to an exemplary embodiment of the present invention. This apparatus can be included in a receiver, e.g., a mobile station or a fixed cellular terminal. A received signal $y_n$ from a transmitter, e.g., a base station, is down converted to a baseband signal, sampled, with a predefined burst length, and stored in a Buffer 100. The received signal $y_n$ can be written as:

$$y_n = h_0 u_n + \ldots + h_L u_{n-L} + e_n, n=1,\ldots,K \quad (3)$$

where K is the burst length, $h=[h_0, \ldots, h_L]$ is the radio channel, $e_n$ represents noise, and $u_k$ is the transmitted symbol at time k, which can be given by the equation:

$$u_k = e^{j\theta_i k} v_k^i, i=1,2 \quad (4)$$

where $V^i_k$ is a symbol from a specific symbol constellation (for instance a 8-PSK signal), and $\theta_i$, i=1, 2 is the offset chosen for the present modulation format (for instance $\theta_i = \pi/8$ for $\pi/8$ offset 8-PSK). In the following description, it is assumed that a first modulation type, with offset $\theta_1$, is used for a first part of the received signal, e.g., the training sequence, and a second modulation type, with offset $\theta_2$, is used for a second part of the received signal, e.g., the information sequence. The first part of the received signal which contains the training sequence is output from the Buffer 100 to a Derotation unit 105 unit that de-rotates the first portion by a factor $\theta_1$. The output from the Derotation 105 unit can then be written as:

$$\tilde{y}_n^{(1)} = e^{-j\theta_1 n} y_n \quad (5)$$
$$= h_0 v_n^{(1)} + h_1 e^{-j\theta_1} v_{n-1}^{(1)} + , \ldots , + h_L e^{-j\theta_1 L} v_{n-L}^{(1)} + e'_n$$
$$= H_{mod_1}^T V_n^{(1)} + e'_n, n = n_0, n_0+1, \ldots, n_1$$

where $H_{mod_1} = [h_0, h_1 e^{-j\theta_1}, \ldots, h_L e^{-j\theta_1 L}]^T$, $V_n^{(1)} = [v_n^{(1)}, \ldots, v_{n-L}^{(1)}]^T$, and $e'_n$ is a rotated version of the noise. The signal $\tilde{y}_n^{(1)}$ is then fed to a Synchronization unit 110 that correlates the signal $\tilde{y}_n^{(1)}$ with the known training sequence $v_l^{(1,TS)}, l=1, \ldots, n_{TS}$ of the communication system in order to determine where the training sequence begins within the received burst to establish burst synchronization. The Synchronization unit 110 may be implemented with any type of conventional synchronization device, e.g., that described in J. Proakis, Digital Communications, McGraw-Hill Inc., New York, 1995 and WO 96/13910.

Information representing the starting or synchronization position of the training sequence, together with the derotated signal $\tilde{y}_n^{(1)}$ and the system training sequence $v_l^{(1,TS)}$, are then input to a Channel Estimator 130 which estimates the received signal with regard to the first modulation type. The Estimator 130 can be implemented with any type of conventional channel estimator, e.g., a Least Squares estimator. The output from the Channel Estimator 130, which is an estimate of the channel for the first modulation type, $H_{mod_1} = \{\hat{h}_i^{(1)}\}_{i=0,L}$, is fed to a Channel Transformation unit 135, along with the system training sequence $v_l^{(1,TS)}$. The Channel Transformation unit 135 transforms the estimate to a channel estimate that corresponds to the second modulation type, $H_{mod_2} = \{\hat{h}_i^{(2)}\}_{i=0,L}$. An exemplary transform algorithm is described in more detail below.

A second portion of the received signal $y_n$, corresponding to, e.g., the information sequence, stored in the Buffer 100 is derotated in a De-rotation unit 120, resulting in a signal $\tilde{y}_n^{(2)}$ which can be given by the equations:

$$\tilde{y}_n^{(2)} = e^{-j\theta_2 n} y_n \quad (6)$$
$$= h_0 v_n^{(2)} + h_1 e^{-j\theta_2} v_{n-1}^{(2)} + \ldots + h_L e^{-j\theta_2 L} v_{n-L}^{(2)} + e_n''$$
$$= H_{mod_2}^T V_n^{(2)} + e_n'', n = 1, n_a, n_a + n_{TS} + 1, \ldots, K$$

where $H_{mod_2} = [h_0, h_1 e^{-j\theta_2}, \ldots, h_L e^{-j\theta_2 L}]^T$, $V_n^{(2)} = [v_n^{(2)}, \ldots, v_{n-L}^{(2)}]^T$, and $e_n''$ is a rotated version of the noise.

The channel estimate for the second modulation type is then input to an Equalizer 140 together with the derotated information sequence $\tilde{y}_n^{(2)}$. The Equalizer 140 can be of any kind, for instance a Maximum Likelihood Sequence Estimator (MLSE) equalizer as described in J. Proakis, Digital Communications. The Equalizer 140 demodulates the received signal. From the received sequence y, the Equalizer tries to find the most likely transmitted symbols v. The output from the Equalizer 140 is the decided symbol.

According to an exemplary embodiment, the channel transformation can be performed in the following manner. Assume the Channel Estimator 130 is of the Least Squares type. Then, the least squares estimate of $H_{mod_1}$ can be written as:

$$\hat{H}_{mod_1} = \left(\sum_k V_k^* V_k^T\right)^{-1} \left(\sum_k V_k^* \tilde{y}_k^{(1)}\right) \quad (7)$$
$$= \left(\sum_k V_k^* V_n^T\right)^{-1} \left(\sum_k V_k^* \tilde{V}_k^T\right) H + \left(\sum_k V_k^* V_n^T\right)^{-1} \left(\sum_k V_k^* \tilde{V}_k^T e_n'\right)$$

where V* is the complex conjugate of V, and $\tilde{V}_k = [v_k, v_{k-1} e^{-j\theta_1}, \ldots, v_{k-L} e^{-j\theta_1 L}]^T$. As can be seen from Equation 7, $\hat{H}_{mod_1}$ is an estimate of the channel that corresponds to the first modulation type, since it depends on the offset $\theta_1$ (through the vector $\tilde{V}_k$) for this modulation. However, the relationship between $\hat{H}_{mod_1}$ and H can be written according to:

$$\hat{H}_{mod_1} = AH + \epsilon \quad (8)$$

where $\epsilon$ is the uncertainty in the estimate, and A is given by:

$$A = \left(\sum_k V_k^* V_k^T\right)^{-1} \left(\sum_k V_k^* \tilde{V}_k^T\right) \quad (9)$$

Since $\theta$ and $V_k$ are known in advance from the system training sequence, A can be precomputed. Further, from Equation 6 it can be seen that:

$$H_{mod_2} = BH$$
$$B = \text{diag}(1, e^{-j\theta_2}, \ldots, e^{-j\theta_2 L}) \quad (10)$$

where diag(X) is a diagonal matrix with diagonal element X. Thus, the relationship between $\hat{H}_{mod_1}$ and $\hat{H}_{mod_2}$ can be given as:

$$\hat{H}_{mod_2} = C\hat{H}_{mod_1} = BA^{-1}\hat{H}_{mod_1} \quad (11)$$

Both the matrices A and B are known in advance. Hence, the $(L+1) \times (L+1)$ matrix $C = BA^{-1}$ can be precomputed and stored in a memory. Alternately, the matrix C can be computed for each burst. In either case, the channel transformation can be performed with a simple matrix multiplication.

Figure 2:
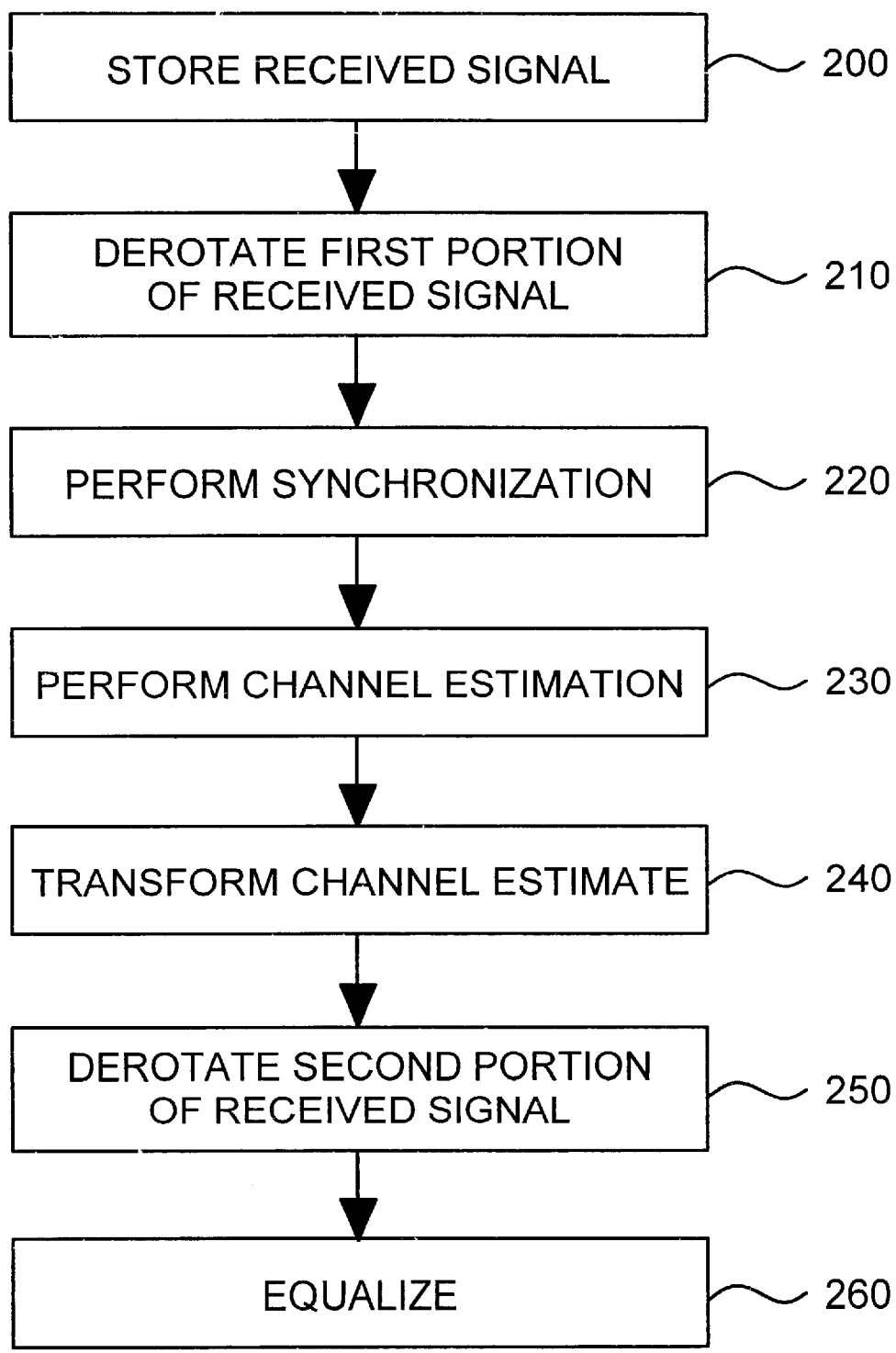
FIG. 2 illustrates an exemplary method for channel estimation and transformation according to an exemplary embodiment of the present invention.

FIG. 2 illustrates a method for channel estimation and transformation according to an exemplary embodiment. The method begins at step 200 at which a received signal is stored in a buffer. At step 210, a first portion of the received signal, e.g., the training sequence, modulated with a first modulation type is derotated. At step 220, synchronization is established by determining the starting position of the training sequence in the received burst. At step 230, channel estimation is performed using the start position and the derotated training sequence, as well as a known training sequence of the communication system. At step 240, the channel estimate for the first modulation type is transformed into a channel estimate for the second modulation type. At step 250, a second portion of the received signal, e.g., the information sequence, modulated with the second modulation type, is derotated. Finally, at step 260, the derotated information sequence is demodulated in an Equalizer using the transformed channel estimate. The output of the Equalizer represents the decided symbol of the second modulation type.

It will be appreciated that the order of steps described is given by way of example only, and the order can be changed as desired. For example, the second portion of the received signal can be derotated at any convenient point before equalization.

For ease of explanation, the description above is based on a signal with one modulation applied to the training sequence and another modulation type applied to the information sequence. However, the invention is not so limited but may apply to any number of modulation types used. For example, assume that a first of the transmitted signal portion, e.g., the training sequence, is modulated with modulation type 1 with phase offset $\theta_1$, a second portion of the transmitted signal, e.g., a first part of the information sequence, is modulated with modulation type 2 with phase offset $\theta_2 \ldots$, and the nth portion of the signal, e.g., the last part of the information sequence, is modulated with modulation type n with phase offset $\theta_n$. Then, the channel estimate $H_{mod_1}$ for the training sequence may be transformed to channel estimates $H_{mod_2}, \ldots, H_{mod_n}$ for each of the n-1 other modulation types.

This invention proposes an efficient method to transform a channel estimate obtained for one modulation type to the corresponding channel estimate for another modulation type. The transform is a function of the offsets used for the different modulation types and the known training sequence, and can therefore be precomputed and stored in memory, which allows for an efficient implementation. The transformed channel estimate is then used in an equalizer for decoding the received data.

It will be appreciated by those of ordinary skill in the art that this invention can be embodied in other specific forms without departing from its essential character. The embodiments described above should therefore be considered in all respects to be illustrative and not restrictive. For example, although described above with reference to mobile and base stations in cellular communication systems, the invention is applicable to other types of communication systems.

What is claimed is:

1. An apparatus for estimating a channel for a received signal, wherein different parts of the received signal are modulated using different modulation types, comprising:
   a channel estimator for estimating the channel based on part of a received signal modulated using a first modulation type; and
   a channel estimate transformer for transforming the channel estimate to another channel estimate corresponding to at least a second modulation type.

2. The apparatus of claim 1, wherein the first modulation type is used for a first portion of the received signal, and the second modulation type is used for a second portion of the received signal.

3. The apparatus of claim 2, wherein the first portion is a training sequence, and the second portion is an information sequence.

4. The apparatus of claim 1, further comprising:
   a first derotator for derotating the part of the received signal modulated using the first modulation type by an amount appropriate for the first modulation type; and
   at least a second derotator for derotating part of the received signal modulated using the second modulation type by an amount appropriate for the second modulation type.

5. The apparatus of claim 1, wherein the channel estimate transformer multiplies the channel estimate by a matrix.

6. The apparatus of claim 5, wherein the matrix is precomputed and stored in a memory.

7. The apparatus of claim 5, wherein the matrix is computed for each sample of the received signal.

8. The apparatus of claim 1, further comprising a synchronizer for determining a starting position of the part of the received signal modulated using the first modulation type to establish synchronization.

9. The apparatus of claim 1, further comprising an equalizer for equalizing the transformed channel estimate and a part of the received signal modulated using the second modulation type.

10. The apparatus of claim 1, further comprising a buffer for storing the received signal.

11. A method for estimating a channel in a received signal, wherein different parts of the received signal are modulated using different modulation types, comprising the steps of:
    estimating a channel based on part of the received signal modulated using a first modulation type; and
    transforming the channel estimate to another channel estimate corresponding to at least a second modulation type.

12. The method of claim 11, wherein the first modulation type is used for a first portion of the received signal, and the second modulation type is used for a second portion of the received signal.

13. The method of claim 12, wherein the first portion is a training sequence, and the second portion is an information sequence.

14. The method of claim 11, further comprising:
    derotating part of the received signal modulated using a first modulation type by an amount appropriate for the first modulation type; and
    derotating part of the received signal modulated using at least a second modulation type by an amount appropriate for the second modulation type.

15. The method of claim 11, wherein the step of transforming the channel estimate comprises multiplying the channel estimate by a matrix.

16. The method of claim 15, wherein the matrix is precomputed and stored in a memory.

17. The method of claim 15, wherein the matrix is computed for each sample of the received signal.

18. The method of claim 11, further comprising:
    determining a starting position of the part of the received signal modulated using the first modulation type to establish synchronization.

19. The method of claim 11, further comprising:
    equalizing the transformed channel estimate and a part of the received signal modulated using the second modulation type.

20. The method of claim 11, further comprising storing the received signal.

* * * * *